United States Patent
Chamarty et al.

(10) Patent No.: US 11,023,379 B2
(45) Date of Patent: Jun. 1, 2021

(54) LOW-POWER CACHED AMBIENT COMPUTING

(71) Applicant: Google LLC, Mountain View, CA (US)

(72) Inventors: Vinod Chamarty, Sunnyvale, CA (US); Lawrence J. Madar, III, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/518,644

(22) Filed: Jul. 22, 2019

(65) Prior Publication Data

US 2020/0257627 A1 Aug. 13, 2020

Related U.S. Application Data

(60) Provisional application No. 62/805,207, filed on Feb. 13, 2019.

(51) Int. Cl.
| | | |
|---|---|---|
| *G06F 12/00* | (2006.01) | |
| *G06F 12/0862* | (2016.01) | |
| *G06F 13/00* | (2006.01) | |
| *G06F 13/28* | (2006.01) | |

(52) U.S. Cl.
CPC .. *G06F 12/0862* (2013.01); *G06F 2212/1028* (2013.01); *G06F 2212/6022* (2013.01)

(58) Field of Classification Search
CPC ......... G06F 12/0862; G06F 2212/1028; G06F 2212/6022
See application file for complete search history.

(56) References Cited

U.S. PATENT DOCUMENTS

| | | |
|---|---|---|
| 7,869,835 B1 | 1/2011 | Zu |
| 9,710,265 B1 | 7/2017 | Temam et al. |
| 9,778,728 B2 | 10/2017 | Dalal et al. |
| 2012/0316838 A1 | 12/2012 | Wheeler et al. |
| 2016/0019158 A1 | 1/2016 | Palacharla et al. |
| 2016/0274648 A1 | 9/2016 | Chu |

(Continued)

FOREIGN PATENT DOCUMENTS

| | | |
|---|---|---|
| EP | 1653331 | 5/2006 |
| TW | 1609260 | 12/2017 |
| TW | 1628599 | 7/2018 |

OTHER PUBLICATIONS

PCT International Search Report and Written Opinion in International Appln. No. PCT/US2019/063274, dated Mar. 4, 2020, 13 pages.

(Continued)

*Primary Examiner* — Mark A Giardino, Jr.
(74) *Attorney, Agent, or Firm* — Fish & Richardson P.C.

(57) ABSTRACT

Methods, systems, and apparatus, including computer programs encoded on computer storage media, for performing a prefetch processing to prepare an ambient computing device to operate in a low-power state without waking a memory device. One of the methods includes performing, by an ambient computing device, a prefetch process that populates a cache with prefetched instructions and data required for the ambient computing device to process inputs to the system while in the low-power state, and entering the low-power state, and processing, by the ambient computing device in the low-power state, inputs to the system using the prefetched instructions and data stored in the cache.

20 Claims, 5 Drawing Sheets

(56) References Cited

U.S. PATENT DOCUMENTS

2017/0024145 A1    1/2017   Zghal et al.
2017/0038813 A1    2/2017   Vanka et al.
2017/0286066 A1*   10/2017   Gathala ............... G06F 11/3624
2018/0074566 A1    3/2018   Fukada
2018/0173627 A1*   6/2018   Hsu .................... G06F 12/0813

OTHER PUBLICATIONS

TW Office Action in Taiwan Application No. 108143750, dated Mar. 30, 2021, 19 pages.

* cited by examiner

LOW-POWER CACHED AMBIENT COMPUTING

CROSS-REFERENCE TO RELATED APPLICATION

This application claims the benefit under 35 U.S.C. § 119(e) of U.S. Patent Application No. 62/805,207, entitled "Low-Power Cached Ambient Computing," filed Feb. 13, 2019, which is incorporated herein by reference in its entirety.

BACKGROUND

This specification relates to systems having integrated circuit devices.

A cache is a device that stores data retrieved from memory or data to be written to memory for one or more different hardware devices in a system. The hardware devices can be different components integrated into a system on a chip (SOC). In this specification, the devices that provide read requests and write requests through caches will be referred to as client devices. Some caches service memory requests for multiple different client devices integrated into a single system, e.g., an SOC, as a last cache before reaching memory. Such caches can be referred to as system-level caches (SLCs).

Caches can be used to reduce power consumption by reducing overall requests to main memory. In addition, as long as client devices can access the data they need in the cache, power can further be saved by placing the main memory as well as data paths to the main memory in a low-power state. Therefore, cache usage is correlated with overall power consumption, and increasing cache usage results in a decrease in overall power consumption. Therefore, devices that rely on battery power, e.g., mobile computing devices, can extend their battery life by increasing cache usage for the integrated client devices.

Some SOC client devices are ambient computing devices that are capable of monitoring and processing sensor inputs while the SOC remains in a low-power state. If the ambient computing device detects a sensor input, e.g., sound arriving at a microphone, a the ambient computing device can trigger the SOC to exit the low-power state if additional processing power is needed to handle the sensor input.

SUMMARY

This specification describes techniques for an ambient computing device to perform a cache preparation process so that the ambient computing device can operate during a low-power state using only the data stored in the cache. This allows the system to power down other high-power devices during a low-power state in which the ambient computing device can still process sensor inputs. For example, these techniques allow the system to power down the main memory, other larger caches in the cache hierarchy, as well as related data pathways and power domains for these components.

Particular embodiments of the subject matter described in this specification can be implemented so as to realize one or more of the following advantages. The computing device can process sensor inputs while the device is in a low-power state. While in the low-power state, the computing device can power down one or more of its power consuming components such as RAMs, client devices, data pathways and interfaces between the components and controllers, e.g. memory controllers.

The computing device can include one or more ambient computing devices (ACDs) that are configured to process the sensor inputs during the low-power state of the computing device. The ACD is capable of determining the data and instructions that may be needed to process the inputs while the computing device is in the low-power state. The ACD prefetches such data and instructions into a local cache memory portion before the computing device enters the low-power state. By using the prefetched data and instructions, the ACD can process sensor inputs without waking the memory controller or a memory device, which helps to minimize power consumption during the low-power state.

In addition, the ACD may need only a portion of the local cache memory for processing the inputs during the low-power state. Accordingly, the rest of the local cache memory can be powered down during the low-power state, resulting in even more savings of power consumption.

In case that the ACD needs more resources than the portion of the local cache memory that is dedicated to the ACD operations during the low-power state, the ACD can trigger the computing device to exit the low-power state. Alternatively or in addition, the ACD can determine a particular portion of a memory device that has the resources that the ACD needs and trigger that particular portion of the memory device to exit the low-power state. Accordingly, other components of the computing device can remain in the low-power mode while the ACD fetches the data it needs from the particular portion of the memory.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
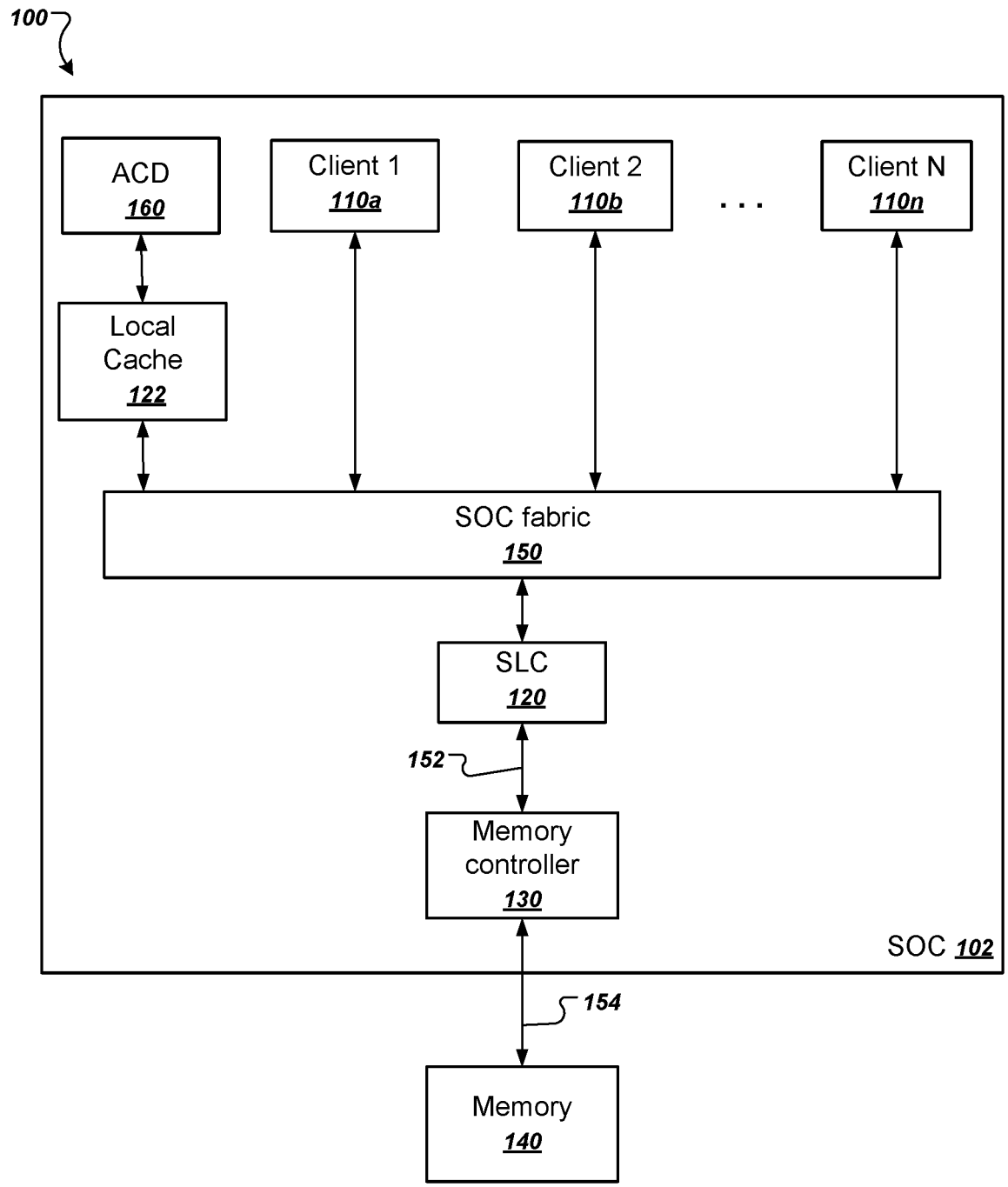
FIG. 1 is a diagram of an example system.

FIG. 1 is a diagram of an example system 100. The system 100 includes a system on a chip (SOC) 102 communicatively coupled to a memory device 140. The SOC 102 has an ambient computing device 160, multiple other client devices 110a-n, and a hierarchy of caches 120 and 122. The cache 122 is a local cache that services only memory requests from the ambient computing device. The cache 120 is a system-level cache that services memory requests from all of the client devices including the ACD 160. The techniques described in this specification can also be used for systems having additional layers of caches between the ACD 160 and the memory 140.

The SOC 102 is an example of a device that can be installed on or integrated into any appropriate computing device, which may be referred to as a host device. Because the techniques described in this specification are particularly suited to saving power consumption for the host device, the SOC 102 can be particularly beneficial when installed on a mobile host devices that rely on battery power, e.g., a smart phone, a smart watch or another wearable computing device, a tablet computer, or a laptop computer, to name just a few examples. While in a low-power mode, the SOC 102 can receive inputs, such as sensor inputs from integrated sensor of the host device. Examples of such sensors include location sensors, presence sensors, gesture sensors, heart rate sensors, and audio sensors, to name just a few examples.

The SOC 102 has multiple client devices 110a-n. Each of the client devices 110a-n can be any appropriate module, device, or functional component that is configured to read and store data in the memory device 140 through the SOC fabric 150. For example, a client device can be a CPU, an application-specific integrated circuit or lower-level components of the SOC itself that are capable of initiating communications through the SOC fabric 150.

One or more of the client devices can be an ambient computing device (ACD) 160. An ambient computing device is a component that is configured to perform computing operations while the SOC 102 is in a low-power state. The ambient computing device 160 is configured to process inputs to the SOC 102 while the SOC 102 is in the low-power state. In addition, the ambient computing device 160 can operate like any other client device during other power states of the SOC 102.

The SOC fabric 150 is a communications subsystem of the SOC 102. The SOC fabric 150 includes communications pathways that allow the client devices 110a-n to communicate with one another as well as to make requests to read and write data using the memory device 140. The SOC fabric 150 can include any appropriate combination of communications hardware, e.g., buses or dedicated interconnect circuitry.

The system 100 also includes communications pathway 152 that allow communication between the SLC 120 and the memory controller 130 as well as an inter-chip communications pathway 154 that allows communication between the memory controller 130 and the memory device 140.

During a low-power state, the SOC 102 can save power by powering down one or more of the communications pathways 152 and 154. Alternatively or in addition, SOC 102 can power down the memory device 140, the memory controller 130, and/or one or more of the client computing devices 110a-n to further conserve power. As another example, the SOC 102 can enter a clock-shut-off mode in which respective clock circuits are powered down for one or more devices.

The caches 120 and 122 are positioned in the data pathway between the ACD 160 and the memory controller 130. The memory controller 130 can handle requests to and from the memory device 140. Thus, requests from the ambient computing device 160 to read from or write to the memory device 140 pass through the caches 120 and 122. For example, the ACD 160 can make a request to read from the memory device 140, which passes through the local cache 122, the SOC fabric 150 and on to the SLC 120. The SLC 120 can handle the request before forwarding the request to the memory controller 130 for the memory device 140.

The SLC 120 can cache read requests, write requests, or both from client devices 110a-n and ambient computing device 160. The SLC 120 can cache read requests by responding to the request with data stored in the cache rather than fetching the data from the memory device 140. Similarly, the SLC 120 can cache write requests by writing the new data in the cache rather than writing the new data in the memory device 140. The SLC 120 can perform a write-back at a later time to store the updated data in the memory device 140.

While the SOC 102 is in the low-power state, the ambient computing device 160 can process inputs to the SOC 102 using only instructions and data stored in one of the caches 120 or 122. Therefore, the SOC 102 can reduce or remove power to one or more other components of the system or all other components of the system. For example, in some implementations, while in the low-power state, even though the ambient computing device 160 is processing inputs, the SOC 102 can still power down the memory device 140 because the ambient computing device 160 does not need to access the memory device 140. For the same reasons, the SOC 102 can also power down the memory controller 130.

To prepare to enter the low-power state, the SOC 102 can pre-fetch, into one of the caches 120 or 122, the instructions and data required to process inputs to the SOC 120 during the low-power state. The SOC 102 can then enter the low-power state by powering down other components, and the ambient computing device 160 can use the instructions and data stored in the cache to process inputs to the SOC 102 while the SOC 102 is in the low-power state.

Figure 2:
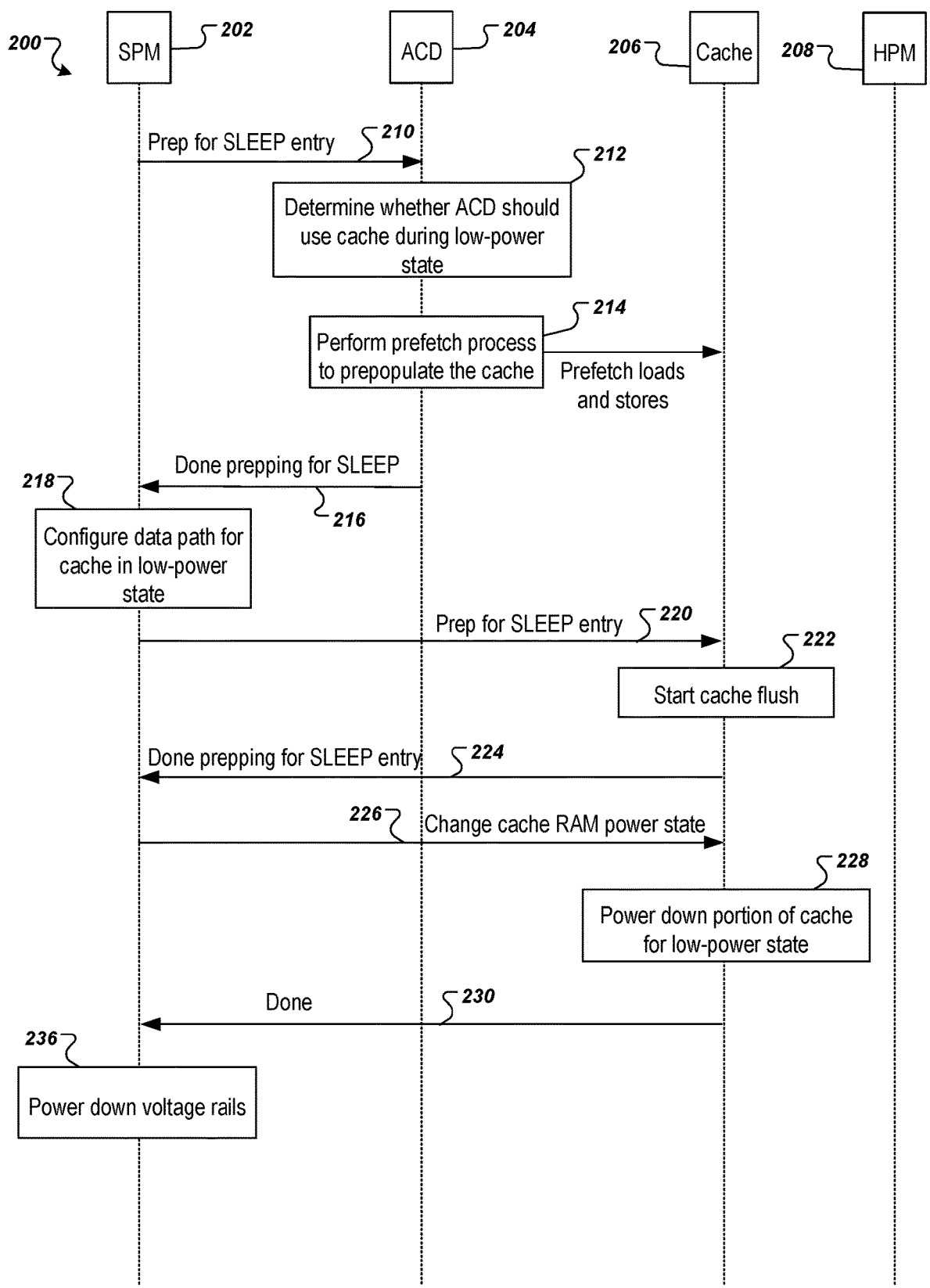
FIG. 2 is a sequence diagram illustrating an example process for transitioning into a low-power state.

FIG. 2 is a sequence diagram illustrating a sequence of events 200 of an example process for transitioning a system-on-a-chip (SOC) into a low-power state. In this example, the low-power state is named SLEEP. The example process 200 can be performed by the components of the SOC 102.

The process illustrated in FIG. 2 is performed by four main components: a software power manager SPM (SPM) 202, an ambient computing device (ACD) 204, a cache 206, and a hardware power manager (HPM) 208. The SPM 202 controls one or more voltage rails, each corresponding to a data path between multiple components of the SOC. For example, the ACD 204 can be in communication with multiple portions of the cache 206 and each portion can be connected to the ACD 204 through a data path. When the SPM 202 powers down one or more voltage rails, the ACD 204 and the cache 206 can lose their connection through data paths associated with the one or more voltage rails.

The HPM 208 controls the power of the components of the SOC. For example, the HPM 208 indicates which components are powered up and which components are powered down.

Before the SOC 102 enters a low-power state, the SPM 202 sends a notification 210 to the ACD 204. Upon receiving the notification 210, the ACD 204 prepares for operating during the SOC's low-power state. The ACD 204 makes a determination on whether the ACD should use the cache 206 during the low-power state (212). In some implementations, this determination can be based on which of several low-power states the device is entering. For example, the device can support multiple low-power states, and in some of them, the ACD can exclusively use a cache without accessing memory.

As part of this process, the ACD 204, or another component, can determine which cache in a hierarchy of caches should be used for the low-power state. In general, as caches get closer to memory, their speeds decrease and their storage sizes and power consumption increase. Therefore, the ACD 204 can determine a size of a low-power procedure to be executed during the particular low-power state and can select the smallest cache that can accommodate the instructions and data needed to execute the low-power procedure during the low-power state.

To prepare the cache 206 for use during SOC's low-power state, the ACD 204 executes instructions of a prefetch process to prepopulate the cache (214). The instructions of the prefetch process include prefetch loads and prefetch stores that prepopulate the cache. This prefetch process prepares the cache by ensuring that all instruction reads and data reads that will be needed during the low-power state get stored in the cache. In other words, the ACD 204 issues instructions for all reads that will be needed in the low-power state. If any of the reads result in a cache miss, the requested data will be populated into the cache from DRAM or from a larger cache that is lower in the cache hierarchy.

In addition, the prefetch process 214 can also prepare the cache by performing writes that are likely to be needed during the low-power state. In other words, the ACD 204 executes write instructions so that the corresponding cache lines are preallocated for use by the ACD 204 during the low-power state. It is not necessary for the write instructions of the prefetch process to use actual data. Rather, it is only important that the cache allocate a cache line for the write so that future write instructions by the ACD 204 in the low-power state will result in a cache hit and will not wake the memory controller, the memory device, or any data pathways to these components. Therefore, the ACD 204 can use dummy data values, e.g., all zeros or random values, when performing the prefetch writes.

The prefetch process 214 may also evict other data and instructions from the cache that will not be used during the low-power state. If the cache 206 is a system-level cache, the evicted data can be data that was stored on behalf of the AOC 204 or other client devices of the system.

In some implementations, the instructions of the prefetch process can be generated by simulating the behavior of the cache 206 in response to the ACD 204 executing read and write instructions. Generating the instructions of the prefetch process can then include adding prefetch load and prefetch store instructions to the prefetch process until it is sufficiently likely that an actual load and store performed during the low-power state will not result in a cache miss. This simulation technique can also be used to determine how much of the cache to allocate to the ACD 204 during the low-power state. For example, if the simulation indicates that there are likely to be cache misses during the low-power state, the system can increase the cache partition size for the ACD 204.

Other cache partitions that are not used by the ACD 204 can be powered off before entering the low-power state. Before being powered off, the state of the cache 206 can be saved in order to restore the state of those non-ACD cache partitions after exiting the low-power state.

When the prefetch process (214) is complete, the ACD 704 sends a notification to the SPM 202, notifying the SPM 202 that the ACD 204 is done prepping for SLEEP (216). In some implementations, the ACD 204 also provides identification information for the portion of the cache 206 that will be used during the low-power state. For example, the ACD 204 can choose one or more cache ways of the cache 206 for operation during the low-power state. In some implementations, the SOC dedicates a default portion of the cache 206 for the ACD 204 operations during the low-power state.

The SPM 202 can configure a data pathway for communications between the ACD 204 and the selected cache 206 during the low-power state (218). This process involves determining which data pathways are required for communication between the ACD 204 and the selected cache. For example, if the selected cache is local to the ACD 204, the SPM 202 may only configure a data pathway between those two components. But if the selected cache is a system-level cache, the SPM 202 may need to configure additional pathways through other, smaller caches on the way to the system-level cache.

The SPM 202 instructs the cache 206 to prepare for the low-power state (220). In response, the cache 205 can perform a cache flush (222) to write non-ACD partitions of cached data into a memory device that allows for retrieval after the low-power state ends. For example, the memory device can be a nonvolatile memory device or a memory device that will remain in retention mode only during the low-power state. In retention mode, the memory device can save power by maintaining previously stored values, but by not supporting the update of the previously stored values.

The cache 206 can thus save a state of the non-ACD partitions of the cache 206 before the SOC enters the low-power state. The saved state of the cache 206 indicates a state of the cache ways before the SOC enters the low-power state. For example, the saved state of the cache 206 can indicate a state of the cache ways before the ACD 204 initiates the prefetch process 214 to prefetch instructions and data into the cache 206. The cache 206 can save the cache state into a non-volatile memory or a memory device that will remain in retention mode. Upon exiting the low-power state, the cache 206 can restore the saved cache state and overwrite the cache portions, e.g., the cache ways, allocated to the ACD 204 during the low-power state. The cache 206 sends a notification 226 to the SPM 202, indicating that cache 206 is ready for the SOC to enter the low-power state.

In response, SPM 202 initiates the low power state. For example, the SPM 202 can instruct the cache 206 to change its RAM power state (226). This cache 205 can then power down portions of the cache that will not be used by the ACD 204 during the low-power state (228). For example, the cache can power down cache ways or entire partitions that are not used by the ACD 204. The cache 205 then informs the SPM 202 that the power down process is done (230).

The SPM 202 powers down one or more voltage rails (236) that are to be powered down during the low-power state. The one or more voltage rails generally do not include the voltage rails that are dedicated to the communications between the ACD 204 and the prefetched portion of cache 206.

The cache 206 can respond back with a verification message verifying that prepping for sleep entry is done (230). The system can then enter the low-power state. During the low-power state, the ACD 204 can process sensor inputs without waking the memory controller or a memory device. Instead, the ACD 204 can process all sensor inputs using only the instructions and data that were prefetched into the cache 206.

The SPM 202 can also power down other components having a connection with the ACD 204. For example, if the SPM 202 can power down one or more voltage rails associated with devices that will be powered down during the low-power state (236). The SPM 202 can also power down the memory controller associated with the memory device, the memory device itself, and one or more communication interfaces, e.g., DDR PHY interfaces, between the memory controller and the memory device. To do so, the SPM 202 can communicate the information of the voltage rails that are powered down or information of the components associated with the respective voltage rail, to the HPM 208 so that the HPM 208 can power down these respective components.

The SOC can also power down any other caches that are lower in the cache hierarchy than the cache selected for the low-power state. For example, as illustrated in FIG. 1, the system can power down the SLC 120 if the local cache 122 was selected for the low-power state. In that case, the HPM 208 can save the SLC state before changing the cache power state. Upon exiting the low-power state, the HPM 208 can restore the saved SLC state.

Figure 3:
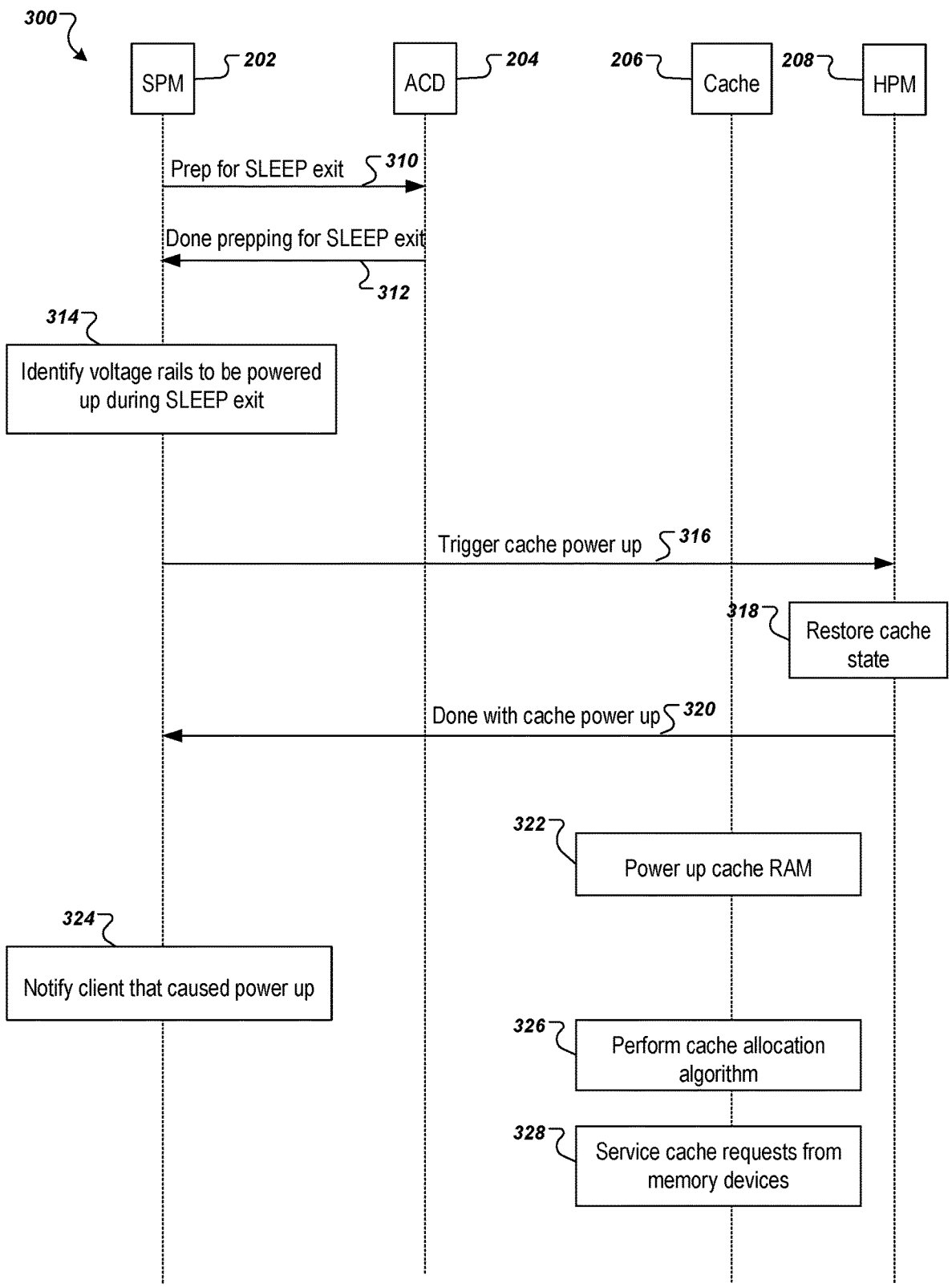
FIG. 3 is a sequence diagram illustrating an example process for exiting a low-power state.

FIG. 3 is a sequence diagram illustrating a sequence of events 300 of an example process for exiting a system on chip (SOC) from a low-power state. The example process 300 can be performed by the components of the SOC 102.

The SOC may exit the low-power state in response to receiving a service request that requires more resources than what ACD 204 can access or provide using only the cache 206. Examples of such service request can include inputs related to any of the sensors of the device, e.g., receiving a phone call, activation of a power-on sensor, or recognizing a voice command. Accordingly, the ACD 204 may trigger the exiting process.

For example, the SOC may be part of a user interactive computing device. The user interactive computing device may enter a sleep mode after being idle for 60 seconds. The user interactive computing device may include an ACD capable of voice recognition. Once the ACD detects the voice of a user, the ACD can trigger the computing device to exit the sleep mode.

Referring to FIG. 3, before the SOC exits a low-power state, the SPM 202 may send a notification 310 to the ACD 204. Upon receiving the notification 310, the ACD 204 prepares for SOC's exit from the low-power state. The ACD 204 may send a notification 312 to the SPM 202, indicating that the ACD 204 is prepared for the SOC to exit the low-power state.

In response, the SPM 202 identifies the voltage rails that are to be powered up for exiting the low-power state. In some implementations, the SPM 202 restores a record of the voltage rails that were powered down at 236 when the SOC entered the low-power state. The SPM 202 powers up all or part of the voltage rails whose information were restored from the record.

In some implementations, the ACD 204 can provide an identification information of the cache portions that the ACD 204 used for prefetching at 214 or used during the low-power state of the SOC. Using this identification information, the SPM 202 can identify the cache portions that were powered down during the low-power state and can power up one or more voltage rails associated with such cache portions.

In some implementations, the SPM 202 powers up all voltage rails associated with the SOC components that need to be operative while the SOC is not in the low-power mode, regardless of the identification information of the components that were operative during the low-power state.

In either case, the SPM 202 sends a notification 316 to the HPM 208, notifying the HPM 208 that the SOC is to be powered up. In response, the HPM 208 powers up the respective components. The HPM 208 can send a notification 320 to the SPM 202, notifying the SPM 202 that HPM 208 is done with powering up or restoring power of the respective SOC components.

In some implementations, the HPM 208 restores the cache power state (318) that was saved at 234, before the SOC entering the low-power state. In these implementations, if one or more cache ways of the cache 206 had no power before the SOC entered the low-power state, the HPM 208 keeps the power of these one or more cache ways down when the SOC exits the low-power state.

In addition to the voltage rails, the SPM 202 can determine the SOC components that were powered down during the low-power state. For example, the SPM 202 may have stored a list of the memory controllers and communication interfaces, e.g., DDR PRY, that were powered down when the SOC entered the low-power state and trigger the HPM 208 to power up the respective memory controllers and communication interfaces.

The SPM 202 can trigger the cache 206 to exit the low-power state, for example, by sending a message to the cache 206. To exit the low-power mode, the cache 206 powers up cache RAM(s) (322).

Upon powering up the respected components, the SOC exits the low-power state and the SOC can process the input that caused exiting of the SOC from the low-power state. The input may be a request submitted by a client device. The SPM 202 can notify the client device (324) that the SOC is ready to process the request.

In some implementations, the cache 206 powers up all cache RAM when the SOC exits the low-power state. In some implementations, the cache 206 restores a record of the cache RAM that were operative before the SOC entered the low-power state and powers up only the respective cache RAM. For example, the cache 206 may have stored such a record in a non-volatile memory before entering the low-power state.

As noted above, in some implementations, the cache 206 can save a state of the cache 206 before the SOC enters the low-power state. Upon exiting the low-power state, the cache 206 can restore the saved state and overwrite the cache portions, e.g., cache ways, allocated to the ACD 204 during the low-power state.

When the SOC exits the low-power state, the cache 206 can start operating as it was operating before the SOC entered the low-power state. For example, the cache 206 can perform a cache allocation algorithm (326) in order to allocate cache partitions for servicing memory requests after exiting the low-power state.

Similarly, other components lathe SOC can start operating as they were operating before the SOC entered the low-power state. For example, the cache 206 can start communicating with a memory device, e.g., the memory device 140, to service memory requests (328) submitted by one or more client devices.

The SOC may exit the low-power state in response to receiving an input that requires using more resources than what the ACD 204 and the prefetched portion of the cache 206 can provide. The ACD 204 may determine that the prefetched information in the cache 206 is not sufficient to process a particular input. For example, the ACD 204 may receive a fingerprint input from a fingerprint sensor. The ACD 204 may determine that the fingerprint does not match any fingerprint patterns stored in the prefetched cache portion. Accordingly, the ACD 204 may trigger the SOC to exit from the low-power mode to access a memory that has stored more fingerprint patterns.

In some implementations, there may be no need to exit the whole SOC from the low-power mode; rather, powering up just a portion of the SOC may be enough for processing a particular input that requires more resources than the ACD 204 and the prefetched cache portion. In these implementations, the SOC performs a transition in the low-power state, where some, but not all, of the SOC components are powered up for the purpose of processing the particular input.

In the example above, the SOC may determine that providing access to more fingerprint patterns can give the ACD 204 the information it needs. Accordingly, the SOC may determine a portion of the cache 206 or a non-volatile memory device that has stored the fingerprint patterns, and power up only the respective SLC portion or path to the non-volatile memory device to provide the ACD 204 the information that the ACD 204 needs for processing the received fingerprint input.

Figure 4:
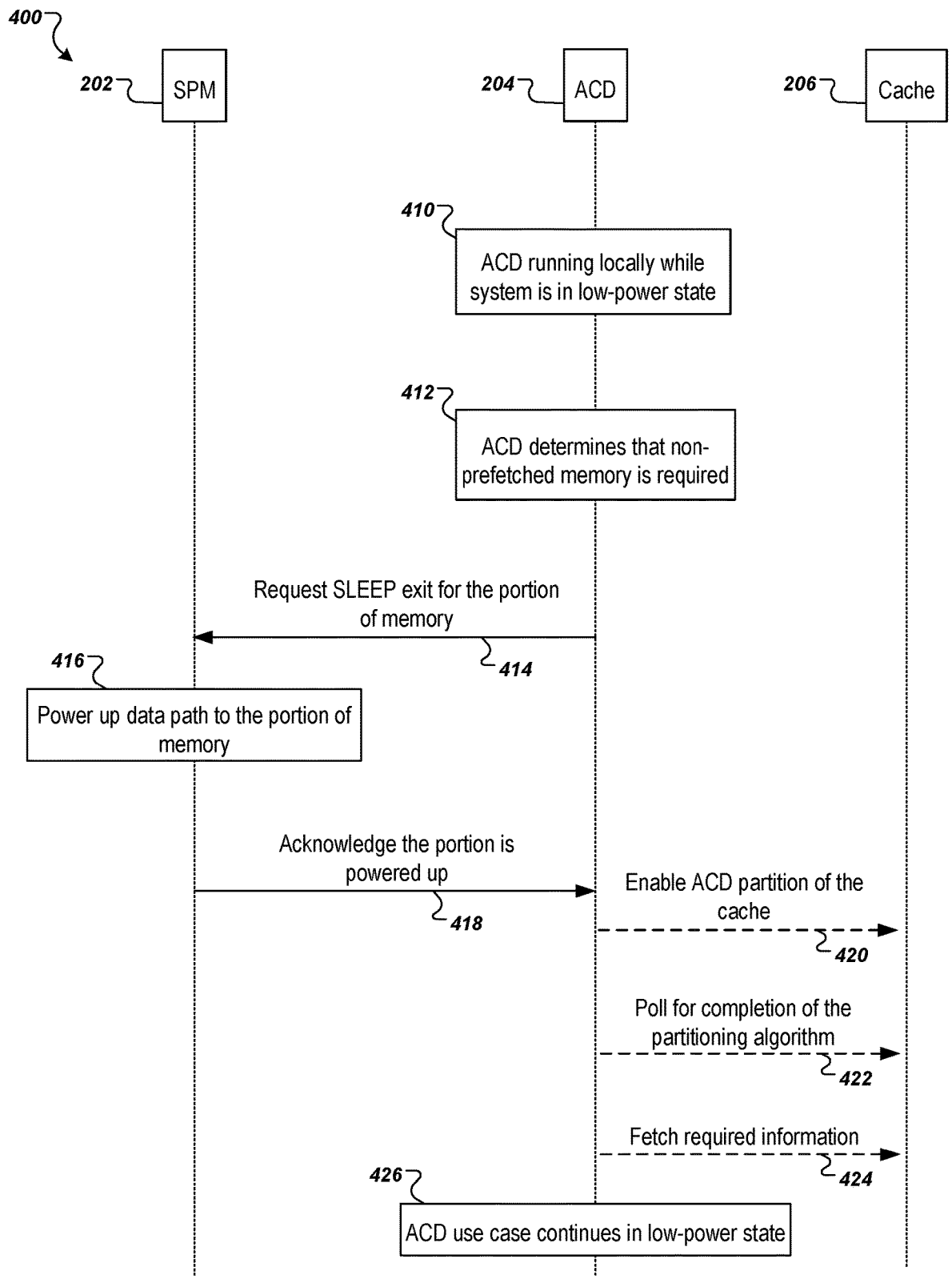
FIG. 4 is a sequence diagram illustrating an example process for performing a partial power transition from a low-power state.

FIG. 4 is a sequence diagram illustrating a sequence of events 400 of an example process for performing a partial power transition from a low-power state of a SOC. The example process 400 can be performed by the components of the SOC 102. The SOC performs the transition by powering up one or more additional components of the SOC without fully powering up the entire system. The one or mote components are powered up to provide the resources that the ACD 204 needs for processing a particular input that the ACD 204 cannot process by only using the information prefetched in the cache 206.

While the ACD 204 processes inputs to the SOC during the SOC's low-power state (410), the ACD 204 may determine that it needs particular information that the ACD 204 did not prefetch into the cache 206 before the SOC entered the low-power state. For example, the ACD 204 may determine that processing a particular sensor input requires non-prefetched information. (412). The required information can be stored in a downstream cache in the cache hierarchy or in RAM. Thus, the system can power up additional components necessary to obtain the information in order for the ACD 204 to continuing processing without waking the entire system.

The ACD 204 sends a request to the SPM 202, requesting that the SPM 202 enable the data path needed to access to the particular information. The ACD 404 can determine the location of the information and request that the data path to the location is enabled (414).

The SPM 202 powers on the data path to the determined location (416). For example, the SPM 202 can power up voltage rails on the required data path. The SPM 202 can also communicate with an HPM to power up the respective downstream cache or memory device includes the particular information. The SPM 202 can send a confirmation message 418 to the ACD 204, acknowledging that the data path and memory portion are powered up.

As part of this process, the ACD 204 can make use of the cache 206. Thus, the ACD 204 can enable an ACD partition of the cache (420). This allows the required information to be fetched from the cache 206 if it is already stored there or cached if it needs to be fetched from other downstream caches or memory. Enabling the ACD partition can cause the cache 206 to perform a partitioning algorithm to determine how many and which cache ways to allocate to the ACD 204. During this time, the ACD can poll the cache 206 for completion of the partitioning algorithm (422).

When the partitioning algorithm is finished, the ACD partition of the cache is ready for use. Thus, the ACD 204 can fetch (424) the required information, which can result in such information being stored in the ACD partition of the cache 206. The ACD use case can then continue in the low-power state (426). In other words, the system can resume the low-power state without waking all components of the system, e.g., all the client devices. In addition, once the ACD 204 is done fetching the particular information, the memory portion from which it was fetched can be powered down again and join the other inactive components of the SOC in the low-power state.

In the present disclosure, any of the notifications or communication messages sent between any two components may be in form of an interrupt or be provided in response to a polling. For example, a first device may send a message to a second device in response to receiving a poll from the second device inquiring whether a job has been performed by the first device. Alternatively, the first device may send the message to the second device once the first device finishes the job, regardless of whether the second device sent a poll.

Figure 5:
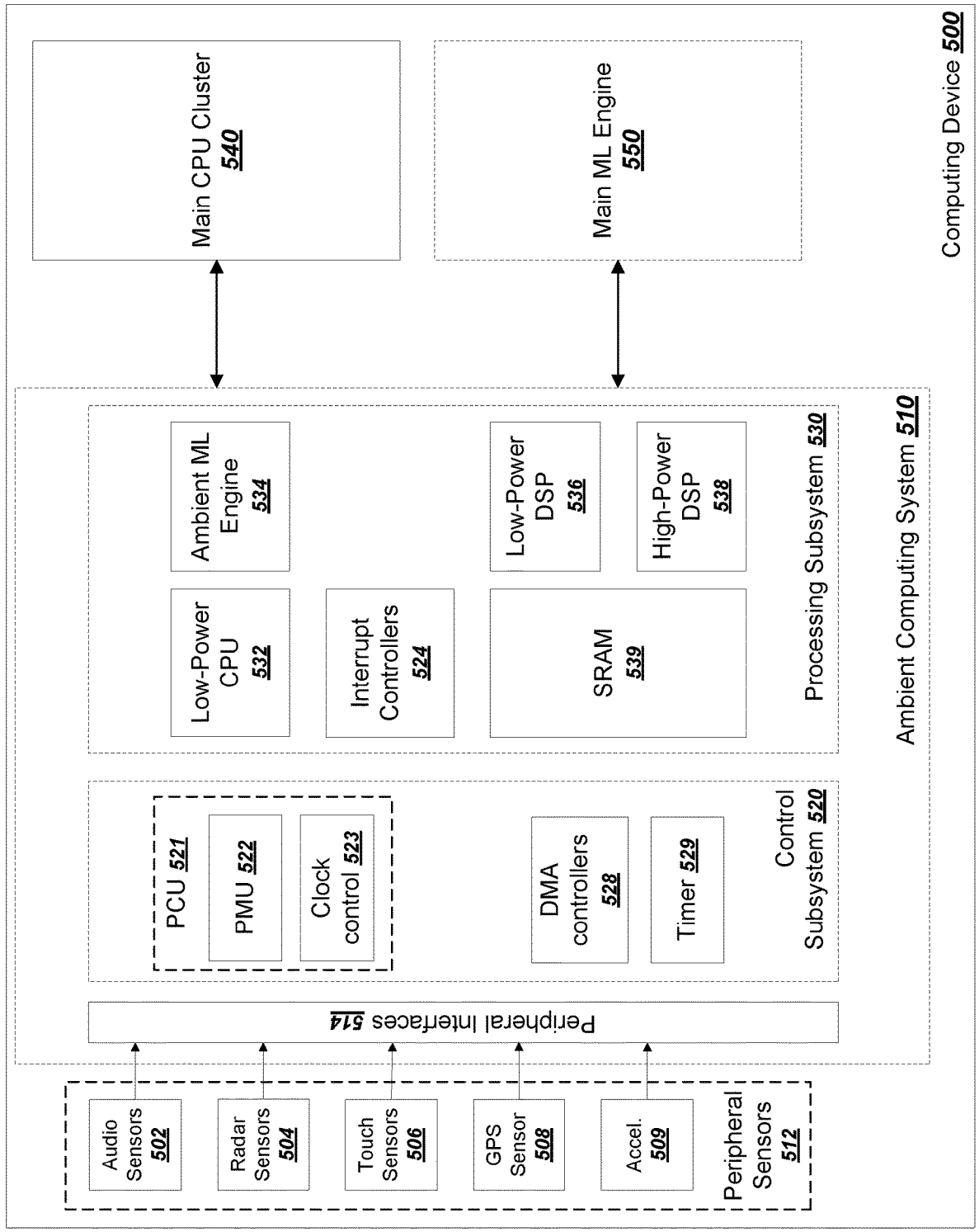
FIG. 5 is a diagram of an example computing device that includes a low-power, ambient computing system.

FIG. 5 is a diagram of an example computing device 100 that includes a low-power, ambient computing system 510. The ambient computing system 510 is an example of a system can perform the functionalities of the ambient computing device described above. The functionality described below uses two other example computing systems, a main CPU cluster 540 and a main machine learning (ML) engine 550. Each of these two components can function as one of the client devices 110*a-n* of the SOC 102 described above with reference to FIG. 1. In other words, the ambient computing system 510, the main CPU cluster 540, and the main ML engine 550 can all be integrated into the same SOC and share a same system-level cache, e.g., the SLC 120.

The example device 500 can include a system implemented in an any appropriate computing device, e.g., a smart phone, a smart watch, a fitness tracker, a personal digital assistant, an electronic tablet, a laptop, to name just a few examples. The system of computing device 500 can be used so that the computing device 500 can remain in a low-power state yet continually monitor and respond to inputs from the environment by sequentially waking appropriate processing components of the system. In this specification, the terms wake and activate will be used to mean supplying an increased amount of power to a particular processing component or other electronic circuitry. The system may or may not have been supplying power to a processing component or other circuitry that is being awoken or activated. In other words, a component being awoken or activated may or may not have been completely powered down previously. Waking or activating a processing component can result in the processing component performing a boot process and causing instructions and data for the processing component to be loaded into random-access memory. Alternatively or in addition, waking or activating a processing component can include resuming from a previously suspended state.

The one or more components of the computing device 500 can be implemented on a system on a chip (SoC) within the computing device. An SoC can be an integrated circuit that includes each component of the system on a single silicon substrate or on multiple interconnected dies, e.g., using silicon interposers, stacked dies, or interconnect bridges. Other components of the computing device, including a main CPU cluster 540, can be implemented on the same or on a separate die. The computing device 500 may include components, including the sensors 512, one or more displays, a battery, and other components, that are separate from and independent of the SoC, and may for example be mounted on a common housing.

Briefly, and as described in further detail below, the device 500 includes a number of peripheral sensors 512 configured to generate sensor signals based on input from the environment of the computing device. The device 500 includes a control subsystem 520 for controlling the supply of power and sensor signals to components in the system. And the device 500 includes a processing subsystem 530 for processing sensor signals and generating outputs.

The device 500 also includes a main CPU cluster 540. The main CPU cluster 540 is a component of the computing device that includes one or more general-purpose processors that are separate from the devices in the processing subsystem 530. The processors of the main CPU cluster 540 generally have more computing power than any of the devices in the processing subsystem 530, and therefore, the processors of the main CPU cluster 540 may also consume more power than any of the devices in the processing subsystem 530.

The device 500 can also optionally include a main machine learning (ML) engine 550. The main ML engine 550 is a special-purpose processing device that is configured to perform inference passes through one or more machine learning models. Each inference pass uses inputs and learned parameter values of a machine learning model to generate one or more outputs predicted by the learned model. The main ML engine 550 can include one or more compute tiles. In general, a compute tile is a self-contained computational component configured to execute a set of computations independently. The tiles of the main ML engine 550 can be arranged in a network and programmed so that each tile of the main ML engine 550 is configured to perform operations of one portion of an inference pass through the machine learning model. For example, if the machine learning model is a neural network, each tile in the main ML engine 550 can be configured to compute the computations of one layer of the neural network. A suitable machine learning engine having multiple compute tiles is described in U.S. Pat. No. 9,710,265, which is incorporated herein by reference. The main ML engine 550 also provides higher performance computing power than any of the devices in the processing subsystem 530 of the ambient computing system 510. Therefore, the main ML engine 550 also consumes more power than any of the devices in the processing subsystem 530.

The processing subsystem 530 includes an ambient machine learning engine 534. The ambient ML engine 534 is also a special-purpose processing device that is configured to perform inference passes through one or more machine learning models. When the device 500 includes both a main ML engine 550 and an ambient ML engine 534, the ambient ML engine 534 has fewer compute tiles and therefore has less processing power than the main ML engine 550 and consumes less power than the main ML engine 550. For example, the ambient ML engine 534 can be implemented as one or two tiles, whereas the main ML engine 550 can have 8-16 or more interconnected tiles.

Although not depicted, the computing device 500 can also include one or more other components commonly found on such computing devices, e.g., a display, a modem, a graphics processing unit, a display processor, or a special-purpose image processor, to name just a few examples. These components can be powered down during the low-power states described below and activated if the system determines that the sensor signals match an application requiring their activation.

The device 500 includes a number of peripheral sensors 512. The peripheral sensors 512 include one or more audio sensors 502, one or more radar sensors 504, one or more touch sensors 506, a Global Positioning System (GPS) sensor 508, and an accelerometer 510. The system can include additional, fewer, or alternative peripheral sensors. For example, the system can include a Wi-Fi signal detector, a cellular signal detector, a barometer, a thermometer, a magnetometer, or other types of peripheral sensors.

The peripheral sensors 512 can be devices configured to generate sensor signals in response to environmental inputs. The one or More audio sensors 502, e.g., microphones, can generate audio signals based on sounds in the environment. For example, the audio sensors 502 can generate audio signals corresponding to human speech. The one or more radar sensors 504 can detect radar signals based on reflected radio waves emitted by a transmitter of the computing device. Variations in reflected radio waves can indicate movement in the environment. For example, the radar sensors 504 can generate radar signals that are received due to being reflected off of the user, e.g., when the user is making gestures in proximity to the computing device. Similarly, the one or more touch sensors 506 can generate signals due to touch gestures made by a user of the computing device on a presence-sensitive or pressure-sensitive interface of the device. The GPS sensor 508 can generate signals in response to received location data communications. And the accelerometer 510 can generate signals due to accelerations experienced by the computing device. In this specification, whenever sensor signals are described as being inputs to other processing components, the inputs can be analog electrical signals generated by the sensors themselves, digital representations of the sensor signals, or processed digital representations of the sensor signals that represent one or more properties of the original signals. The peripheral sensors of the computing device 500 can also include an inertial measurement sensor, a barometer, a specific absorption rate proximity sensors, and WiFi network name sensors, to name just a few other examples.

The ambient computing system 510 includes one or more peripheral interfaces 514. The peripheral interfaces 514 can be a component of the computing device 500 that is powered on even when the device is in its lowest power state. The peripheral interfaces 514 can include any appropriate peripheral interface for converting inputs received from the peripheral sensors 512 into sensor signals to be used by the ambient computing system 510. For example, the peripheral interfaces 514 can include a pulse density modulation (PDM) interface, an inter-IC sound (I2S) interface, an inter-integrated circuit (I2C) interface, an I3C interface, a time division multiplexed (TDM) interface, and a serial peripheral interface (SPI), to name just a few examples.

Each of the peripheral interfaces 514 is configured to generate a respective interrupt upon detecting an environmental input. In general, each interrupt can identify a source of the sensor data, e.g., an identifier of a peripheral interface or sensor responsible for the interrupt. The interrupts are received and processed by one or more interrupt controllers 524. For example, upon receiving an interrupt, the interrupt controller 524 can wake a power control unit (PCU) 521, which includes a power management unit (PMU) 522 and a clock control unit 523. The PMU 522 can control which components of the device 500 receive power and how much power each component receives. The clock control unit 523 can control the frequency at which the components of the device 500 operate. In some implementations, each processing component has a different clock frequency that is a multiple or a fraction of a base clock frequency. By having a clock frequency that is a multiple or a fraction of a base clock frequency, each processing component can more efficiently exchange signals with other processing components.

Upon receiving an interrupt, the PCU 521 can determine based on the source of the interrupt which other components of the ambient computing system 510 should be activated in order to further process the sensor signals causing the interrupt. In order to provide processing support for such components, the PCU 521 can wake the static random access memory (SRAM) 539 and the system communications fabric. The fabric is a communications subsystem that communicatively couples the internal components of the ambient computing system 510, their communications to external components, or some combination of these. The fabric can include any appropriate combination of communications hardware, e.g., buses or dedicated interconnect circuitry.

The static random access memory (SRAM) 539 can be a general purpose random-access memory device that can be shared by multiple processing components of the processing subsystem 530. For example, the SRAM 539 can store sensor signals, processor instructions and data, system outputs, and other data, e.g., neural network parameters of neural network models that are or will be implemented by the ambient ML engine 534. In general, an SRAM is distinguishable from dynamic random-access memory (DRAM) in that an SRAM need not be periodically refreshed. As described in more detail below, the SRAM 539 is accessible to the processing components in the processing subsystem 530 directly or through one or more DMA controllers. In some implementations, the SRAM 539 includes multiple banks, which can each store substantially similar amounts of data, e.g., 1, 10, or 100 MB each. In addition, each individual bank can include multiple blocks that can be individually powered-down when entering the low-power state. By carefully sequencing the order that the blocks are powered-down amongst the four banks, the SRAM address space can remain contiguous.

When the PCU 521 wakes the SRAM 539, the PCU 521 can wake fewer than all of the blocks or all of the memory banks of the SRAM 539. The PCU 521 can instead Wake only a number of blocks that is sufficient for the next component of the processing subsystem 530 to determine whether to further escalate powering up of components of the device 500.

The PCU 521 can also supply different power levels to different blocks of the SRAM 539. For example, in the monitoring power state, the PMU 522 can supply a lower, retention voltage to the entire SRAM 539 to reduce its power consumption. The PMU 522 can also supply the retention voltage to the SRAM 539 if no processing components need to access to the SRAM 539. In the processing power state, the PMU 522 can provide normal voltage to all or portions of the SRAM 539 and lowered or no voltage to other parts of the SRAM 539.

During the process of handling an interrupt, the ambient computing system 510 can also wake one or more DMA controllers 528. The DMA controllers 528 can manage DMA pathways that allow higher data bandwidth for incoming sensor signals. For example, a DMA controller 528 can be used to continuously stream audio data from a microphone into the SRAM 539 for access by processing components in the processing subsystem 530. Conversely, a DMA controller can also be used to continuously stream audio data stored in the SRAM 539 for output as sound through one or more speakers. The DMA controllers 528 can also be used to stream any appropriate sensor data into the SRAM 539, but using programmed IO may be computationally cheaper than activating a DMA controller for small quantities of data. Thus, the ambient computing system 510 can activate and use the DMA controllers 528 for relatively high-bandwidth sensor data, e.g., audio data and radar data, and can used programmed IO for other types of sensor data.

After preparing the fabric and the SRAM 539, the PCU 521 can then use the interrupts to determine which other component of the processing subsystem 530 to wake. For example, the PMU 522 can control whether power is provided to the low-power CPU 532, the low-power DSP 536, or other components of the processing subsystem 530 depending on which of one or more sensors generated an interrupt. In some implementations, the peripheral interfaces 514 and the components of the control subsystem 520 are the only components of the device 500 that are powered on in a monitoring power state, which is a power state in which the system is waiting to receive interrupts due to environmental inputs to the computing device.

The processing components of the processing subsystem 530 include a low-power CPU 532, an ambient ML engine 534, a low-power DSP 536, and a high-power DSP 538. In some implementations, the processing subsystem has multiple instances of one or more of these components, e.g., multiple low-power DSPs or multiple high-power DSPs. For example, the processing subsystem 530 can have one high-power DSP that is dedicated to processing audio signals and a separate high-power DSP that is dedicated to processing radar signals. Alternatively or in addition, the processing subsystem 530 can have a high-power DSP that is dedicated to processing image data.

When performing the prefetch process describe above with reference to FIG. 2, the ambient computing system 510 can issue prefetch load and store instructions for any appropriate combination of the devices in the processing subsystem 130. In other words, the ambient computing system 510 can prefetch instructions for the low-power CPU, the ambient ML engine 534, the low-power DSP 536, the high-power DSP 538, or some combination of these. In some implementations, the ambient computing system 510 only prefetches instructions for components that consume the least amount of power. For example, the ambient computing system 510 can prefetch instructions for only the low-power CPU 532 and the low-power DSP 536. This will allow the system to process most sensor signals during the low-power state without waking the memory controller or the memory device. If additional processing is needed, the system can fetch such instructions using the DMA controllers 528 after waking the memory controller and memory device.

The prefetch process effectively extends the size of memory available to the ambient computing system 510 in the low-power state. In other words, instead of only being limited to the amount of internal SRAM 539 during the low-power state, the ambient computing system 510 can also have access to SRAM of the cache used for the prefetch process. This effective extends the available memory to be at least the same of the internal SRAM 539 plus the size of the cache allocated to the ambient computing system 510.

In the monitoring power state, the processing components in the processing subsystem 530 can be maintained in a retention mode. The PCU 521 can maintain a component in retention mode by reducing or eliminating power that is provided to the component. For example, in the retention mode, the PCU 521 can supply a processing component with just enough power to Maintain register states, but not enough power to process data in the registers.

The low-power CPU 532 can be a general-purpose programmable processor that includes registers, control circuitry, and an arithmetic logic unit (ALU). In general, the low-power CPU 532 consumes less power than the main CPU cluster 540 of the computing device, and may contain fewer processing cores. In some implementations, the low-power CPU 532 is primarily a scalar processor that operates on single instructions and single data inputs.

The low-power CPU 532 can receive interrupts and sensor signals when the system enters the processing power state. Based on the type of sensor signals the lower-power CPU 532 receives and based on the properties of those sensor signals, the low-power CPU 532 can determine that other components of the system should be activated, e.g., the communications fabric, the DMA controllers 528, the SRAM 539, or some combination of these. After activating these components, the low-power CPU 532 can optionally return to a non-operational state.

The low-power CPU 532 can provide the sensor signals, or a processed version thereof, to the ambient engine 534 for further interpretation. For example, if the low-power CPU 532 receives sensor signals corresponding to accelerometer input, the low-power CPU 532 can determine that the ambient ML engine 534 should further process the sensor signals. For example, the ambient ML engine 534 can then further process the sensor signals to determine that the signals represent walking, jogging, biking, falling, or traveling in a car.

The low-power CPU 532 can also bypass the ambient ML engine 534 for some signals. If, for example, the low-power CPU 532 receives a sensor signal corresponding to a simple touch input on a touch interface of the computing device, the low-power CPU 532 can process the touch input without the aid of other processing components, e.g., by causing the display of the computing device to be turned on by the main CPU cluster 540 or a graphics processor. The low-power CPU 532 can also determine that the main CPU cluster 540 of the computing device, or another component of the computing device outside of the device 500, should further process certain sensor signals. The low-power CPU 532 can make such a determination, for example, if it determines that no other processing components in the device 500 can properly process the sensor signals.

One task of the ambient ML engine 534 is to use sensor signals to perform an inference pass over a model to generate an output that may trigger waking other processing components to further process the sensor signals. In other words, the ambient ML engine 534 can receive sensor signals, or a processed version thereof generated by the low-power CPU 532 or another processing component, and the ambient ML engine 534 can generate an output that represents which other processing components should further process the sensor signals. The output generated by the ambient ML engine 534 can explicitly specify a combination of processing component IDs or an identifier of an enumerated power state or the output can be a representation of a power state that is interpreted by a low-power processing component, e.g., the low-power CPU or the low-power DSP, in order to identify other higher-power processing components that should process the sensor signals. As part of this process, the low-power processing component can explicitly or implicitly determine whether any other processing is required. For example, the low-power processing component can determine, based on the output of the machine learning engine, that no further processing is required and that the system can transition back to the monitoring power state.

In the lowest-level monitoring power state, the PCU 521 can keep the ambient ML engine 534 in a low-power state or powered down completely. In the processing power state, the PCU 521 may or may not provide power to the ambient ML engine 534 depending on what sensor signals are available at the peripheral interfaces 514 and how the low-power CPU 532 or the low-power DSP 536 interpret the signals. In some implementations, the low-power DSP 536 or the low-power CPU 532 interpret the signals to instruct the PCU 521 to provide power for an additional, intermediate power state, in which the ambient ML engine 534 is also powered on for the inference pass, but no other high-power processing components are yet powered on.

The ambient ML engine 534 can also implement other machine learning models for processing sensor signals. For example, the ambient ML engine 534 can implement a simplified speech recognition model that allows the ambient ML engine 534 to recognize some voice-based commands. Because the model may be installed on a mobile computing device with limited memory capacity, the number of recognized commands may be smaller than for online voice recognition processes.

The ambient ML engine 534 can alternatively or in addition implement a machine learning model that provides on-chip automatic speech recognition. In other words, the ambient ML engine 534 can perform inference passes through the model in order to generate a live transcription of speech captured in the audio signals.

As another example, the ambient ML engine 534 can implement a text-to-speech model that generates audio output signals from particular text inputs, in which the audio output signals can be interpreted as human speech in a particular language by users. In some implementations, the device 500 can use a speech recognition model and the text-to-speech model in tandem to provide a low-power dialogue engine. For example, after the ambient ML engine 534 recognizes a particular command, the low-power CPU 532 can take particular actions to effectuate the command and also to provide a particular text response back to the ambient ML engine 534. The ambient ML engine 534 can then use the text-to-speech model to generate an audio output representing a response to the initial command. In some implementations, the entire data flow of speech recognition, action execution, and text-to-speech response can be performed without ever waking up the main CPU cluster 540 of the device.

For example, if a user provides the voice command, "louder," the ambient ML engine 534 can generate an output representing that the audio signals corresponding to a voice command to increase the volume of music being played by the device. The machine-learning engine 534 can provide the output to the low-power CPU 532, which can effectuate the command by issuing a signal to one or more integrated speaker subsystems. The low-power CPU 532 can then provide a text response, "volume at level 5," to the ambient ML engine 534. The ambient ML engine 534 can then process the text response with the text-to-speech model to generate an audio output, which the device can play over the one or more integrated speaker subsystems. Thus, the ambient computing system 510 process the entire dialogue sequence without waking up the main CPU of the device.

The ambient ML engine 534 can also implement any of a variety of other models. The ambient ML engine 534 can also implement a gesture recognition model that interprets features of hand gestures made by a user of the computing device. For example, the inputs to the model can be processed radar signals received by the computing device, and the output of the model can be predictions of gestures that the user has made. Each hand gesture can correspond to a particular command, and the ambient ML engine 534 can provide the output to the low-power CPU 532, or another processing component, for further action.

The ambient ML engine 534 can include one or more memory banks for storing model parameters and other model configuration information. For example, the machine-learning engine 534 can store data representing neural network connections and neural network parameters. The ambient ML engine 534 can include one or more multiply accumulate (MAC) units and one or more sum registers for computing neural network activations or other neural network layer outputs, and a controller for controlling data exchange between the memory banks and the MAC units. The ambient ML engine 534 can also include instruction memory, direct memory access paths, registers, and other processing components. In some implementations, the ambient ML engine 534 is a machine learning compute tile that is configured to accelerate the computation of machine learning inference passes.

The low-power DSP 536 and the high-power DSP 538 are special-purpose processors configured for efficient decoding and processing of highly-vectorized signals. The processing subsystem 530 can include a variety of DSPs that are designed for different purposes. For example, the processing subsystem 530 can include a DSP that is configured to process radar signals, a DSP that is configured to process audio signals, a DSP that is configured to perform dataplane algorithms, a DSP that is configured to process wireless communications signals, and a DSP that is configured to process GPS signals, to name just a few examples.

As described above, the low-power DSP 536 can perform the initial interpretation of sensor signals from the control subsystem 520. The low-power DSP 536 can also perform other signal processing tasks as well. In general, high-power DSPs consume higher levels of power than low-power DSPs because they have more active registers, they access and process more data in parallel, because they rely more heavily on memory operations, or some combination of these.

The control subsystem 520 can also include a timer 529, which is an electronic timer that can detect system malfunctions and resolve those malfunctions. During normal operation, the system can regularly reset the timer 529 to prevent the timer 529 from timing out. If, e.g., due to a hardware fault or a program error, the system fails to reset a timer, the timer will elapse and generate a timeout signal. The timeout signal can be used to initiate one or more corrective actions. A corrective action can include placing the system in a safe state and restoring normal system operation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The present embodiments in includes systems and methods to enter the system in a low-power state. The system includes multiple integrated client devices, including an ambient computing device that is configured to control operation of the system while the system is in a low-power state, a memory controller configured to read data from a memory device for consumption by the client devices, and a cache configured to cache data requests to the memory controller issued by the ambient computing device. The system is configured to enter the low-power state by performing operations including performing, by the ambient computing device, a prefetch process that populates the cache with prefetched instructions and data required for the ambient computing device to process inputs to the system while in the low-power state, and entering the low-power state. In the low-power state, the ambient computing device is configured to process inputs to the system using the prefetched instructions and data stored in the cache.

In some embodiments, the cache is a system-level cache configured to cache data requests to the memory controller for each of the multiple integrated client devices. In some embodiments, is a local cache that is configured to service memory requests only for the ambient computing device and not for any of the other integrated client devices.

Performing the prefetch process can increase an amount of SRAM memory available to the ambient computing device during the low-power state. In some embodiments, the memory available to the ambient computing device during the low-power state includes an internal SRAM of the ambient computing device and SRAM of the cache.

In some embodiments, in the low-power state, the ambient computing device is configured to process the inputs to the computing device using the prefetched instructions and data without waking the memory device or waking the memory controller.

Performing the prefetch process can include issuing prefetch store memory requests that allocate cache lines in the cache for data that the ambient computing device will be store during the low-power state. The prefetch may store memory requests each write dummy data to the cache.

In some embodiments, the system includes a hierarchy of multiple caches including a system-level cache configured to cache data requests to the memory controller for each of the multiple integrated client devices. Entering the low-power state can include determining a memory size for a low-power procedure to be executed by the ambient computing device in the low-power state, determining, based on the memory size for the low-power procedure to be executed by the ambient computing device in the low-power state, which cache in the hierarchy of multiple caches should be used to store the prefetched instructions and data required for the ambient computing device to process inputs to the system while in the low-power state, and selecting the cache from among the multiple caches in the hierarchy based on the determination.

Entering the low-power state can include powering down all caches that are lower in the hierarchy of caches than the selected cache. Entering the low-power state can include powering down all data paths to the caches that are lower in the hierarchy of caches than the selected cache. Powering down all caches that are lower in the hierarchy of caches than the selected cache can include powering down the system-level cache.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by special purpose logic circuitry, e.g., an FPGA or an ASIC, or by a combination of special purpose logic circuitry and one or more programmed computers.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a host device having a display device, e.g., an electronic display, for displaying information to the user and a keyboard and pointing device, e.g., a mouse, trackball, or a presence sensitive display or other surface by which the user can provide input to the host device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a host device can interact with a user by sending documents to and receiving documents from a device that is used by the user; for example, by sending web pages to a web browser on a user's device in response to requests received from the web browser. Also, a host device can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
   multiple integrated client devices, including an ambient computing device that is configured to control operation of the system while the system is in a low-power state;
   a memory controller configured to read data from a memory device for consumption by the client devices; and
   a cache configured to cache data requests to the memory controller issued by the ambient computing device, wherein the cache is a system-level cache configured to cache data requests to the memory controller for each of the multiple integrated client devices,
   wherein the system is configured to enter the low-power state by performing operations comprising:
      performing, by the ambient computing device, a prefetch process that populates the cache with prefetched instructions and data required for the ambient computing device to process inputs to the system while in the low-power state, and
      entering the low-power state, wherein in the low-power state, the ambient computing device is configured to process inputs to the system using the prefetched instructions and data.

2. The system of claim 1, further comprising a local cache that is configured to service memory requests only for the ambient computing device and not for any of the other integrated client devices, and wherein performing the prefetch process further comprises populating the local cache with a portion of the prefetched instructions.

3. The system of claim 1, wherein performing the prefetch process increases an amount of SRAM memory available to the ambient computing device during the low-power state.

4. The system of claim 3, wherein the memory available to the ambient computing device during the low-power state includes an internal SRAM of the ambient computing device and SRAM of the system-level cache.

5. The system of claim 1, wherein in the low-power state, the ambient computing device is configured to process the inputs to the system using the prefetched instructions and data without waking the memory device or waking the memory controller.

6. The system of claim 1, wherein performing the prefetch process comprises issuing prefetch store memory requests that allocate cache lines in the cache for data that the ambient computing device will store during the low-power state.

7. The system of claim 6, wherein the prefetch store memory requests each write dummy data to the cache.

8. The system of claim 1, wherein the system includes a hierarchy of multiple caches, and wherein entering the low-power state comprises:
  determining a memory size for a low-power procedure to be executed by the ambient computing device in the low-power state;
  determining, based on the memory size for the low-power procedure to be executed by the ambient computing device in the low-power state, which cache in the hierarchy of multiple caches should be used to store the prefetched instructions and data required for the ambient computing device to process inputs to the system while in the low-power state; and
  selecting the system-level cache from among the multiple caches in the hierarchy based on the determination.

9. The system of claim 8, wherein entering the low-power state further comprises:
  powering down all caches that are lower in the hierarchy of caches than the selected cache.

10. The system of claim 9, wherein entering the low-power state further comprises powering down all data paths to the caches that are lower in the hierarchy of caches than the selected cache.

11. The system of claim 10, wherein powering down all caches that are lower in the hierarchy of caches than the selected cache comprises powering down a portion of the system-level cache.

12. A method for entering a low-power state by a system comprising:
  multiple integrated client devices, including an ambient computing device that is configured to control operation of the system while the system is in the low-power state;
  a memory controller configured to read data from a memory device for consumption by the client devices; and
  a cache configured to cache data requests to the memory controller issued by the ambient computing device, wherein the cache is a system-level cache configured to cache data requests to the memory controller for each of the multiple integrated client devices,
  wherein the method comprises:
  performing, by the ambient computing device, a prefetch process that populates the cache with prefetched instructions and data required for the ambient computing device to process inputs to the system while in the low-power state;
  entering the low-power state; and
  processing, by the ambient computing device in the low-power state, inputs to the system using the prefetched instructions and data stored in the cache.

13. The method of claim 12, wherein the cache is a local cache that is configured to service memory requests only for the ambient computing device and not for any of the other integrated client devices, and
  wherein performing the prefetch process further comprises populating the local cache with a portion of the prefetched instructions.

14. The method of claim 12, wherein performing the prefetch process increases an amount of SRAM memory available to the ambient computing device during the low-power state.

15. The method of claim 14, wherein the memory available to the ambient computing device during the low-power state includes an internal SRAM of the ambient computing device and SRAM of the system-level cache.

16. The method of claim 12, further comprising processing, by the ambient computing device in the low-power state, the inputs to the system using the prefetched instructions and data without waking the memory device or waking the memory controller.

17. The method of claim 12, wherein performing the prefetch process comprises issuing prefetch store memory requests that allocate cache lines in the cache for data that the ambient computing device will store during the low-power state.

18. The method of claim 12, wherein the system includes a hierarchy of multiple caches, and wherein entering the low-power state comprises:
  determining a memory size for a low-power procedure to be executed by the ambient computing device in the low-power state;
  determining, based on the memory size for the low-power procedure to be executed by the ambient computing device in the low-power state, which cache in the hierarchy of multiple caches should be used to store the prefetched instructions and data required for the ambient computing device to process inputs to the system while in the low-power state; and
  selecting the system-level cache from among the multiple caches in the hierarchy based on the determination.

19. The method of claim 18, wherein entering the low-power state further comprises powering down all caches that are lower in the hierarchy of caches than the selected cache.

20. The method of claim 19, wherein entering the low-power state further comprises powering down all data paths to the caches that are lower in the hierarchy of caches than the selected cache.

* * * * *